US012771559B2

(12) United States Patent
Hathaway

(10) Patent No.: US 12,771,559 B2
(45) Date of Patent: Oct. 20, 2026

(54) METHOD AND SYSTEM FOR DECENTRALIZED IDENTITY MANAGEMENT AND DATA DISTRIBUTION

(71) Applicant: Michael William Hathaway, Fredericksburg, TX (US)

(72) Inventor: Michael William Hathaway, Fredericksburg, TX (US)

(73) Assignee: Michael William Hathaway, Fredericksburg, TX (US)

( * ) Notice: Subject to any disclaimer, the term of this patent is extended or adjusted under 35 U.S.C. 154(b) by 224 days.

(21) Appl. No.: 18/401,013

(22) Filed: Dec. 29, 2023

(65) Prior Publication Data

US 2024/0179015 A1 May 30, 2024

(51) Int. Cl.
*H04L 9/32* (2006.01)

(52) U.S. Cl.
CPC .......... *H04L 9/3271* (2013.01); *H04L 9/3247* (2013.01)

(58) Field of Classification Search
None
See application file for complete search history.

(56) References Cited

U.S. PATENT DOCUMENTS

2005/0283614 A1* 12/2005 Hardt ...................... H04L 9/321 713/182
2006/0236382 A1* 10/2006 Hinton .................... G06F 21/41 726/8
2018/0295123 A1* 10/2018 Camenisch ............... H04L 9/30
2020/0137064 A1* 4/2020 Wu ....................... G06F 16/182

* cited by examiner

*Primary Examiner* — Jeffrey C Pwu
*Assistant Examiner* — Mayasa A. Shaawat
(74) *Attorney, Agent, or Firm* — Ashurst Perkins Coie US LLP; Michael A. Glenn

(57) ABSTRACT

A computing and network system employs decentralized methods to create and maintain digital identities for network connected computing devices and the distribution of information between them on public and private networks. Embodiments enable identities to be authenticated and digitally signed, and shared information to be validated by network services using locally stored information.

8 Claims, 13 Drawing Sheets

METHOD AND SYSTEM FOR DECENTRALIZED IDENTITY MANAGEMENT AND DATA DISTRIBUTION

CROSS-REFERENCE TO RELATED CROSS-APPLICATIONS

This application claims priority to U.S. provisional patent application Ser. No. 63/424,023, filed Nov. 9, 2022, which application is incorporated herein in its entirety by this reference thereto.

FIELD

Various of the disclosed embodiments concern a method and system for decentralized identity management and data distribution and, in particular, network connected systems that provide decentralized services for management and authentication of digital identities and distribution of information signed by digital identities.

BACKGROUND

Digital identity refers to the information used by computer systems to represent external entities, including a person, organization, application, or device. When used to describe an individual, it encompasses a person's compiled information and plays a crucial role in automating access to computer-based services, verifying identity online, and enabling computers to mediate relationships between entities. Digital identity for individuals is an aspect of a person's social identity and can also be referred to as online identity.

The widespread use of digital identities can include the entire collection of information generated by a person's online activity. This includes usernames, passwords, search history, birthday, social security number, and purchase history. When publicly available, this data can be used by others to discover a person's civil identity. It can also be harvested to create what has been called a data double, an aggregated profile based on the user's data trail across databases. In turn, these data doubles serve to facilitate personalization methods on the web and across various applications.

The legal and social effects of digital identity are complex and challenging. Faking a legal identity in the digital world may present many threats to a digital society and raises the opportunity for criminals, thieves, and terrorists to commit various crimes. These crimes may occur in either the online world, real world, or both.

SUMMARY

Embodiments of the invention use a suite of services deployed on servers and network connected computing devices to enable the creation and enrollment of digital identities and the publishing of identity records, which provide the identity's public encryption key.

Identity records are shared within an organization or realm and across federations of organizations or realms to authenticate identities and validate data signed by digital identities.

Realms operate autonomous network services which create, enroll, and validate digital identities affiliated within the realm. They distribute identity information to computing devices within the realm and with other realms within a federation of realms.

Realm classes include:

Personal—representing an individual with multiple network connected computing devices.

Household—representing a household of personal and household computing devices, and Organization—a business or enterprise with multiple users, and computing devices.

Hierarchies of digital identities created within a realm facilitate the assignment of digital identities to edge servers, personal, mobile, and other computing devices connected on a private network and/or public Internet.

Published identity records shared with subscribing network services enable decentralized authentication and authorization of federated identities accessing network services and verification of digitally signed data. This is achieved with a federated network of realm servers that distribute identity records associated with each realm. Records are distributed on a subscription basis to computing devices within the realm and to other realms within a federation. This enables relevant identity records to be maintained by realm servers which distribute this information to realm computing devices, such that software operating on them can authenticate access to services using identity records stored locally on the system, as well as generate and authenticate digital signatures on information shared with services.

Identity records contain public encryption keys of identities along with additional identity information, enabling records, documents, messages, and collections of records to be digitally signed by one or more signers. Decentralized authentication of signed data is achieved by using locally stored identity records, maintained on a subscription basis. Additional validation of identity records can be achieved using a consensus methodology by the addition of one or multiple digital signatures of realm servers within a federation. In embodiments, realms and federations can independently or collectively establish policies for consensus validation of identity records and other shared data.

The subscription method described herein, insures that subscribers can efficiently limit the information stored locally by subscribing only to specific records or collections of records relevant to local services, thus reducing subscription network traffic and memory requirements.

In embodiments, the system employs a realm hierarchy network architecture for distribution and sharing signed records, messages, and information across public and private networks. Federated networks of realm servers enable a hierarchical distribution of information across federated realms. Realm servers forward subscription data to realm affiliated computing devices connected on public and private networks. This approach eliminates the need for a centralized distribution service, simplifying the forwarding and routing of information and maintaining privacy and security of computing devices within a realm's private network.

DETAILED DESCRIPTION

Embodiments of the invention incorporate a network of computational devices or servers, employing software providing network services specific to the function of the server or device.

Realm Server

Figure 1:
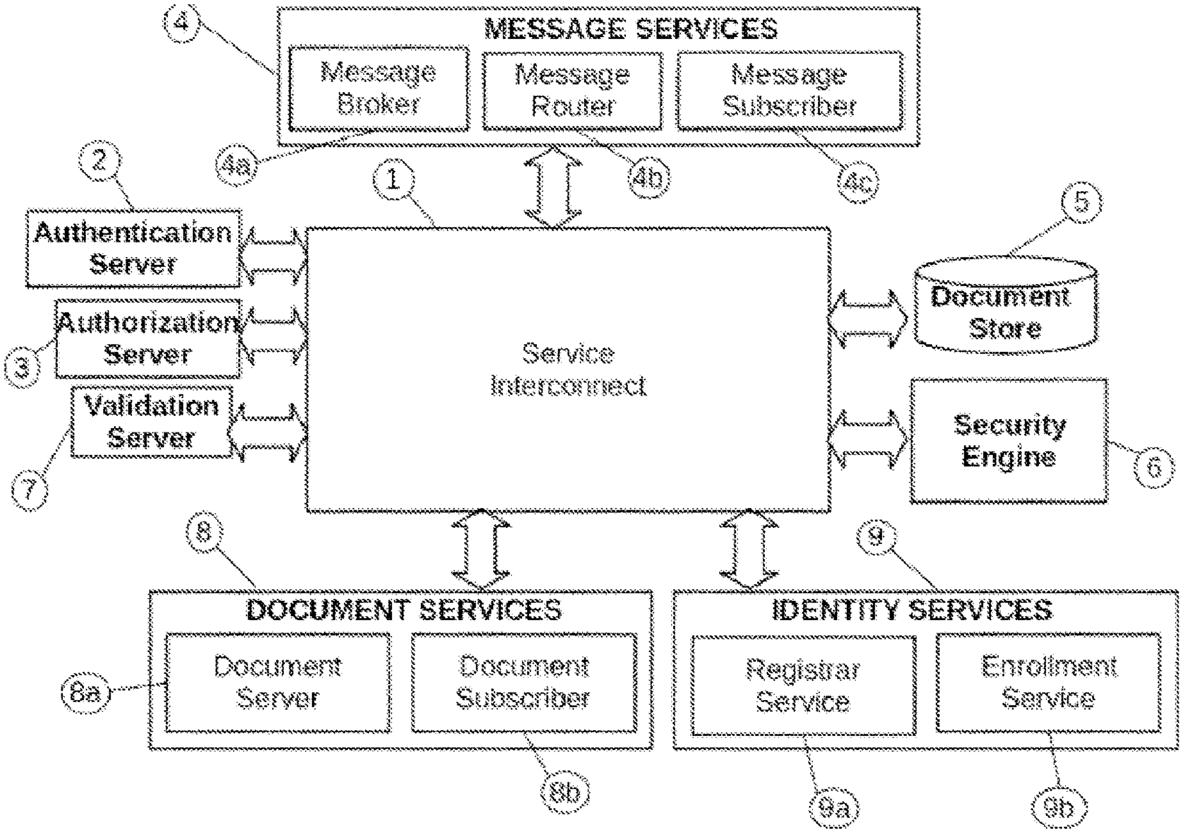
FIG. 1 is a block diagram that shows the service components of a realm server.

FIG. 1 is a block diagram showing a realm server's associated services. The service interconnect 1 is the communication link between services, which can be one or a combination of a private network, interconnecting services running on dedicated server instances, or a local network port in which service software is running on a single server instance. The service interconnect enables services to share API's and service data.

The document store 5 comprises one or both of a document database and a file system with records organized in collections or folders that can be accessed by realm services.

The security engine 6 comprises encryption and decryption hardware or software, document signing and signature authentication software, and a secure private key store which is accessible to security engine encryption/decryption and signing services.

Initial network access to realm services is directed to the authentication server 2. The authentication server uses identity records stored on the document store 5 to authenticate an identity requesting access to services on the realm server. Authentication servers issue a challenge to the requester in which the requester uses its private key to sign and return the challenge to the authentication server. With successful authentication, the identity information is transferred to the authorization server 3 which accesses the document store 5 to determine access permissions of the requester. This information is associated to the network session information that is established by the requested service upon successful completion of authentication and authorization (AuthN/AuthZ) operations.

Message services 4 comprise of three software components functioning as a message broker 4*a*, message router 4*b*, and message client 4*c*. The message broker 4*a* establishes secure socket connections with message clients on other servers that have been authenticated and authorized to subscribe and/or publish on a secure, encrypted subscription channel or subscription group.

The message router 4*b* uses identity information maintained in the document store 5 to forward incoming messages published to it to authenticated subscribers associated with another realm server within a federation with which the server is enrolled.

The message subscriber 4*c* establishes subscriptions to message brokers operating on other federated realms. It also forwards and receives messages for subscribing identities accessible within the realm and forwards published messages from any identities accessible within the realm to the destination message broker. This combination of message services facilitates mesh connectivity for real time messaging across a network of federated realm servers.

Document services 8 consist of a document server 8*a* and document client 8*b*. The document server 8 presents a secure document API to authorized document clients accessible to its local and public network connections. Documents are organized as digital records and collections of records. Realm servers can assign unique document ID's and provide document signing and validation services for validation of shared documents.

The document client 8*b* accesses document servers on other federated realm servers. Document services can be used in conjunction with message services to distribute documents across a network of federated realms.

The validation server 7 facilitates multi-signer validation of information shared within a federation. Validation software implements consensus validation policies and algorithms employed for information shared within a federation. Using signature verification, validators maintain locally stored identity lists to determine the authenticity of the identity tags, identity records, and record signatures. Additional validation steps can be added based on validation policies. These include but are not limited to verifying a realm identity's domain ownership and source IP address verification.

Multi-signer methods include, but not limited to:

A) Full mesh validation, where all validators within a federation share their document signature with all other validators;

B) Random assignment of a validator to receive validation signatures from all other validators and distribute the list to realm subscribers; or C) A pre-specified list of validators for a given document or collection that must sign data before it is considered to be valid.

Identity services 9 include the registrar service 9*a* and enrollment service 9*b* which are network accessible services that facilitate the creation of digital identities. The registrar service 9*a* maintains a list of assigned and unassigned unique identity tags. A requester authenticates with the authentication service and receives an identity tag that is unique across all networks. Registrars receive blocks of unique identity tags from an identity authority (see FIG. 4), which coordinate the assignment of unique identity tags to digital identities. Once an identity tag is registered, the requester receives a one-time access code and link which is used to enroll its public encryption key and relevant identity information.

The enrollment service 9*b* hosts one-time network links and authenticates enrollment with the issued one time passkey. It offers an API for the enrollment of the identity's public encryption key and other identity information that is to be shared by the realm with other realm identities and federated realms.

Edge Server

Figure 2:
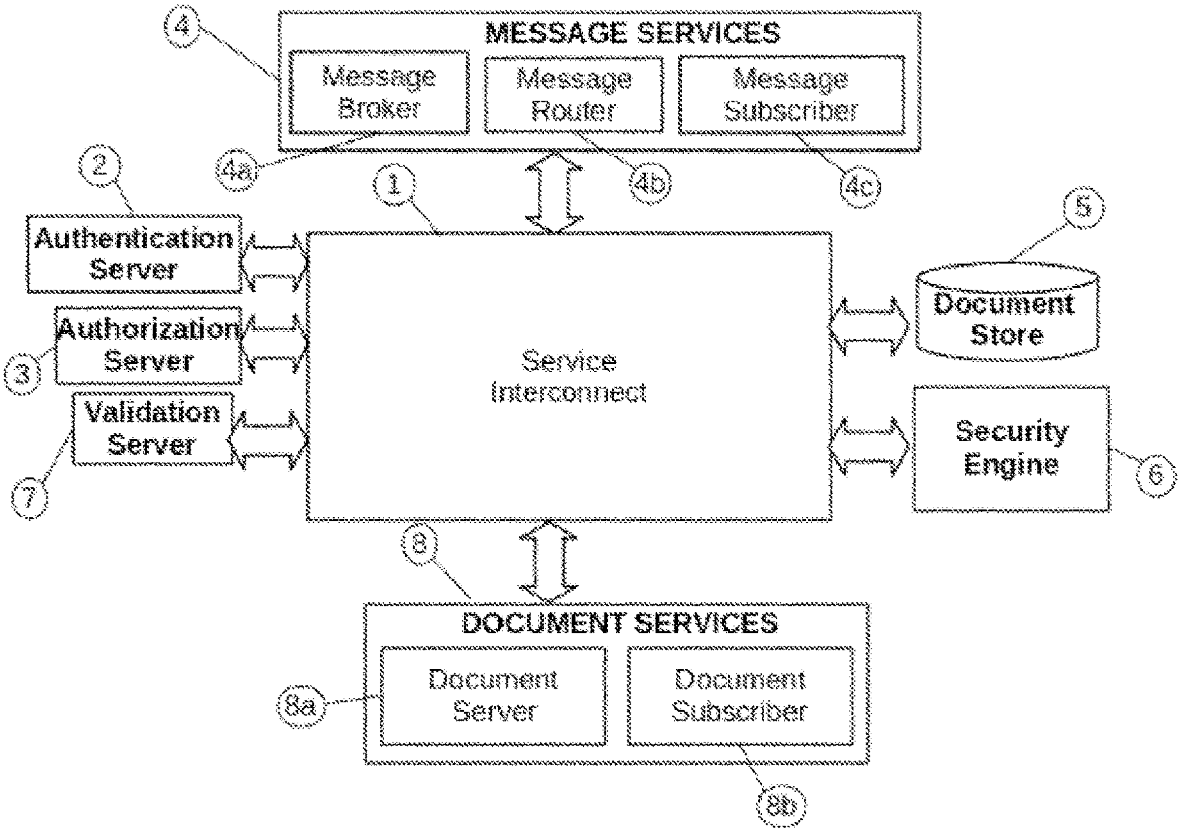
FIG. 2 is a block diagram that shows the service components of an edge server.

FIG. 2 is a block diagram showing the edge server, which consists of identical service elements of a realm server with the exception of identity services. Edge servers enroll with an associated realm server. They offer a message broker 4*a* and document server 8*a* to local edge clients as well as subscribe to message and document services on its associated realm server. Edge servers operate software to connect to local premises systems that include but are not limited to IoT devices, control and automation systems, security systems, and databases, where they digitally sign and authenticate information coming to and from these systems.

Edge Client

Figure 3:
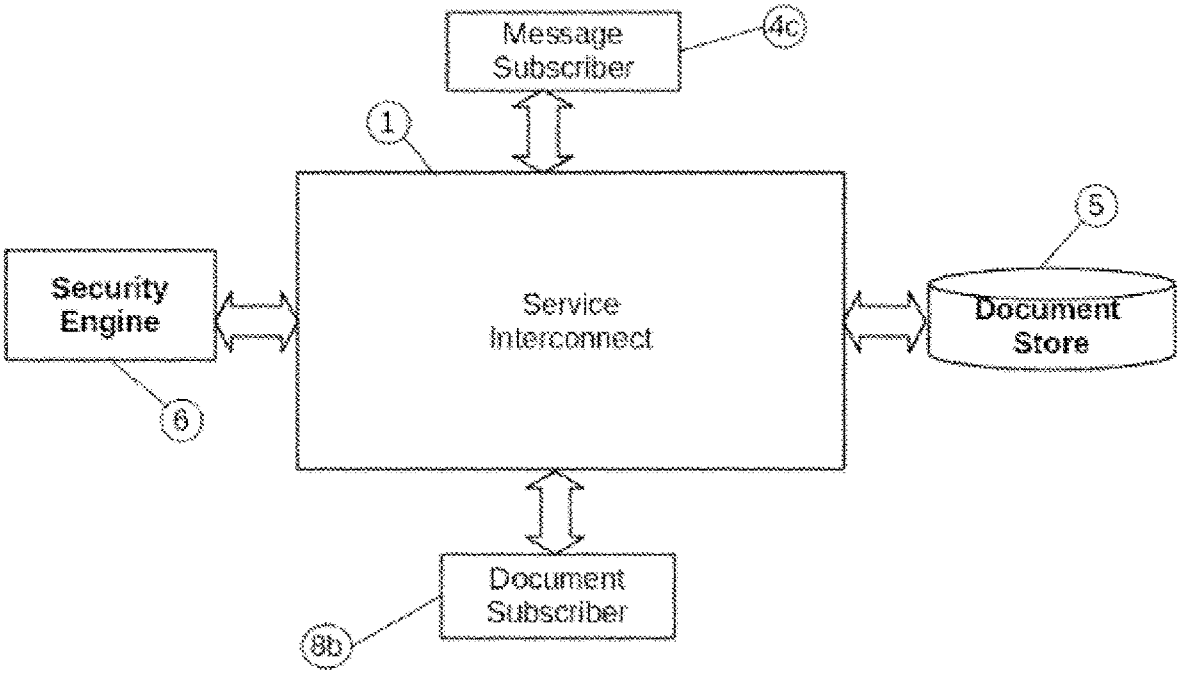
FIG. 3 is a block diagram that shows the service components of an edge client.

Edge client devices, shown in FIG. 3, can optionally connect to an edge server's subscription services or directly to an associated realm server. Edge clients can connect to sensitive systems, where they translate, digitally sign, and/or validate information exchanged with a local edge server or realm server using its document subscriber 8*b* or message client 4*c* services. Edge clients also consist of a document store 5 and security engine 6.

Identity Authorities

Figure 4:
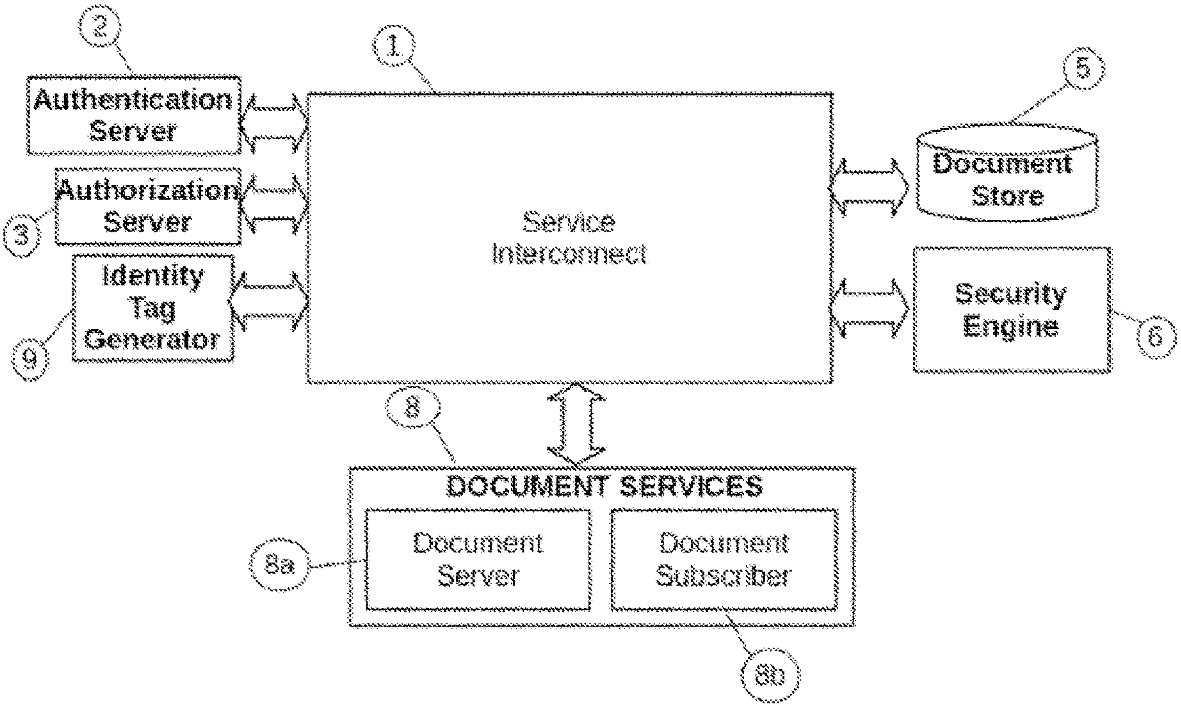
FIG. 4 is a block diagram that shows the service components of an identity authority.

Identity authorities, as shown in FIG. 4, issue unique alpha-numerical identity tags to realm registrars. One or more public identity authorities can be employed to coordinate the distribution of ID tags to realm registrars to insure that all tags are unique across the network. ID authorities use realm services that include document services 8, document store 5, security engine 6, authentication server 2, and authorization server 3. Software functioning as an identity tag generator 9 is added to perform the generation of unique identity tags. The document store 5 maintains lists of identity tags that are issued to realm registrars. A unique identity authority prefix is added to issued ID tags to prevent duplicate tags from being issued on the network when multiple identity authorities are employed.

Realm servers can issue unique private identity tags to identities within its private network or federation with the addition of an identity tag generator 9 service and using the realm server's ID tag as a prefix.

Realm Network Hierarchies

Figure 5:
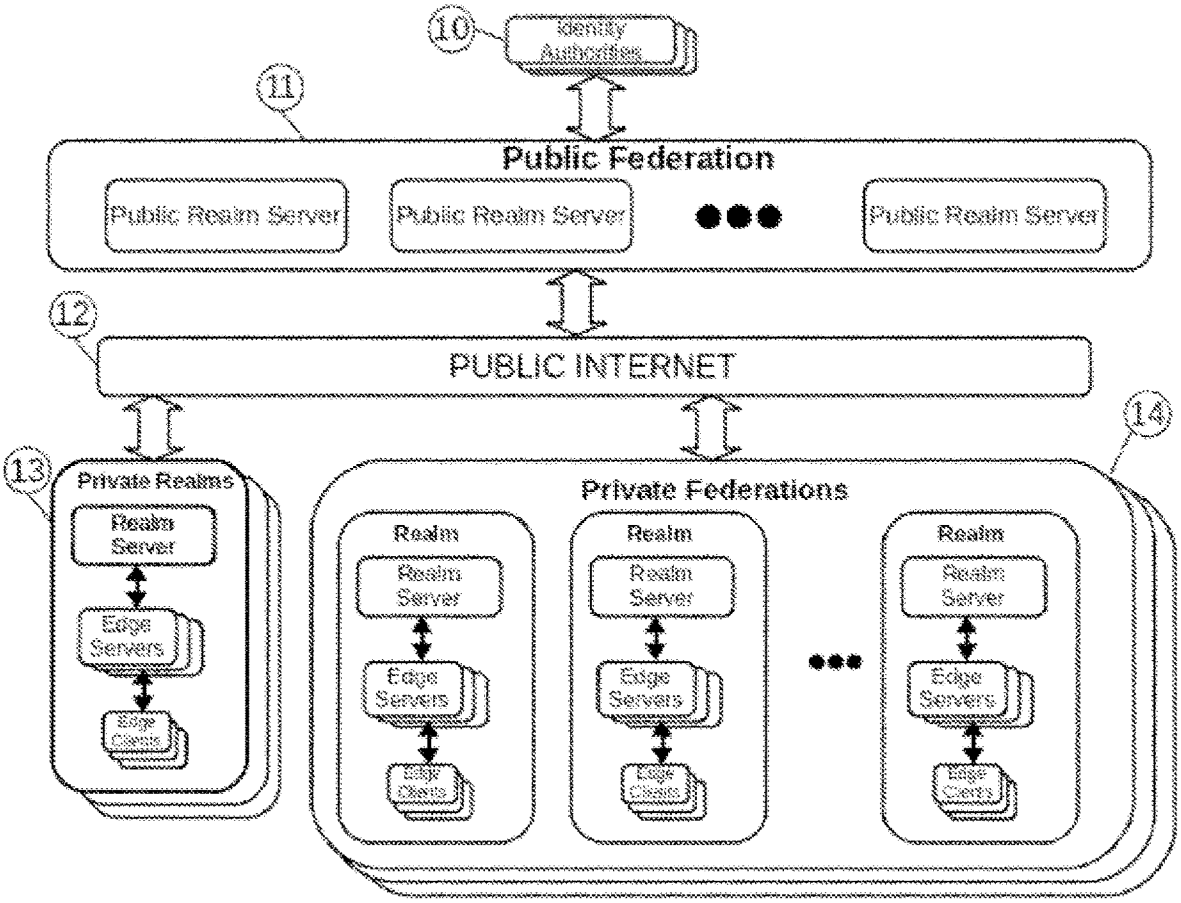
FIG. 5 is a block diagram that shows public and private realm network hierarchies.

FIG. 5 is a block diagram that shows a network hierarchy consisting of a public federation 11 of realm servers and their associated identity authorities 10 which connect on a public Internet 12 to private realm servers 13 and private federations of realm servers 14. FIG. 5 depicts edge servers and edge clients connecting within a private realm, which can connect on a private network such that messages and service data remains off the public Internet.

Identity Records

Figure 6:
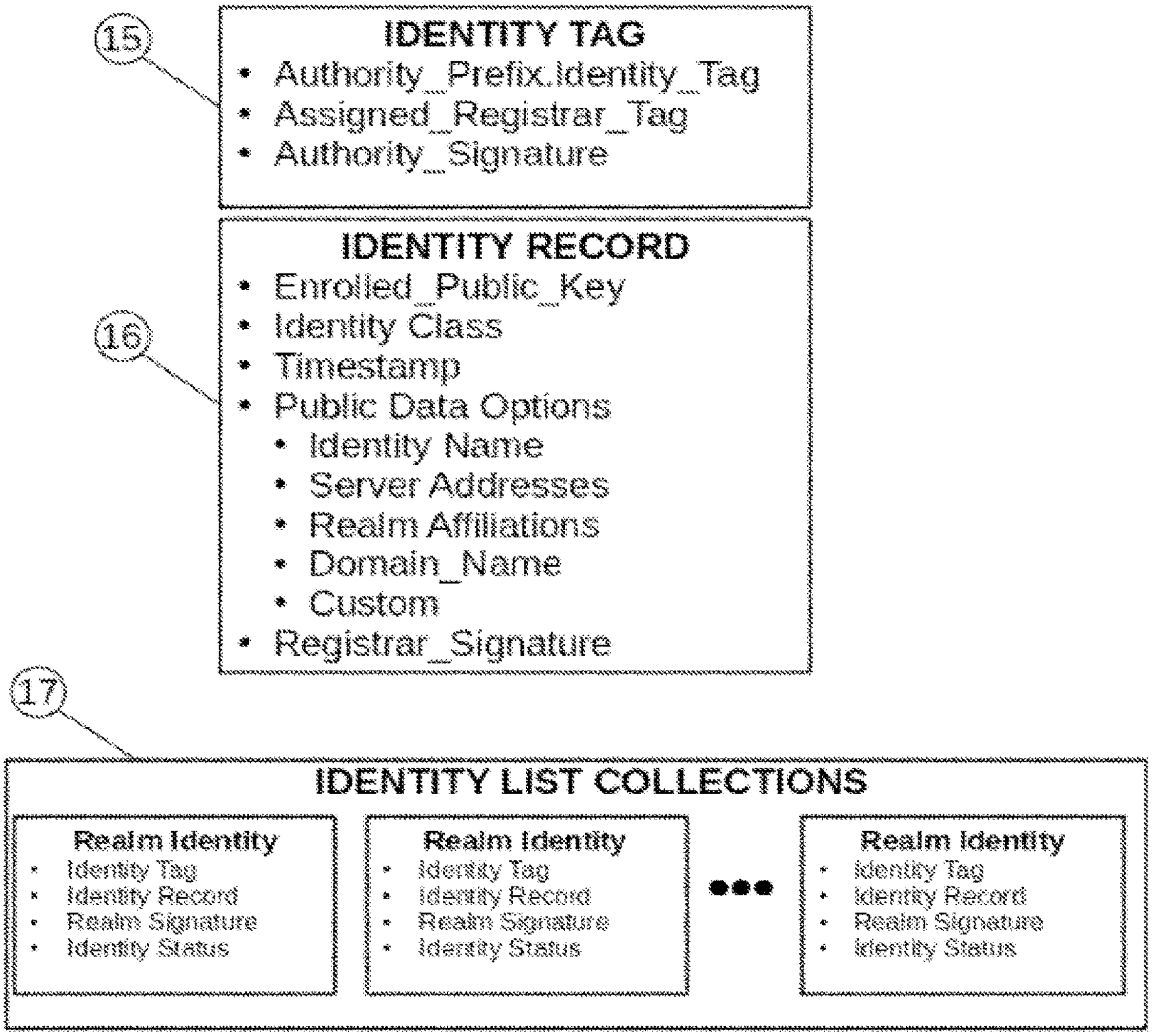
FIG. 6 depicts a data structure of identity records.

FIG. 6 depicts the data structure for an identity record. The identity record consists of an identity tag 15 which contains the tag with an identity authority prefix and a unique alphanumeric identity tag, the identity tag of the registrar that was issued the tag, and the authority's signature of the tag. This is the state in which an unassigned identity tag is issued to a registrar.

The identity record 16 is added to the key during the enrollment process. This data structure contains the identity's public key and identity class, which includes but is not limited to, personal, residential, commercial, and federation. Additional options provide additional information shared within the federation, which can be omitted to establish an anonymous identity.

Fields include:

Identity name—A human readable name for the identity;

Server addresses—IP addresses and ports for services offered within a realm or federation affiliations—federations and realms affiliated with the identity;

Domain name—Realm domain URL custom fields; and

Registrar signature of identity tag and identity record data.

Identity collections 17 can be appended to an identity record. This can be used in a personal realm to register public keys assigned computing devices associated with the identity. Additionally a realm server can use this list for digital identities it has created within its realm for distribution within the realm or with a federation of realms. Identity records are signed by a realm server. A status field is maintained on an identity record by the signing realm server which shows the present state of an identity's status, i.e. active, inactive, or revoked.

Message Routing

Figure 7:
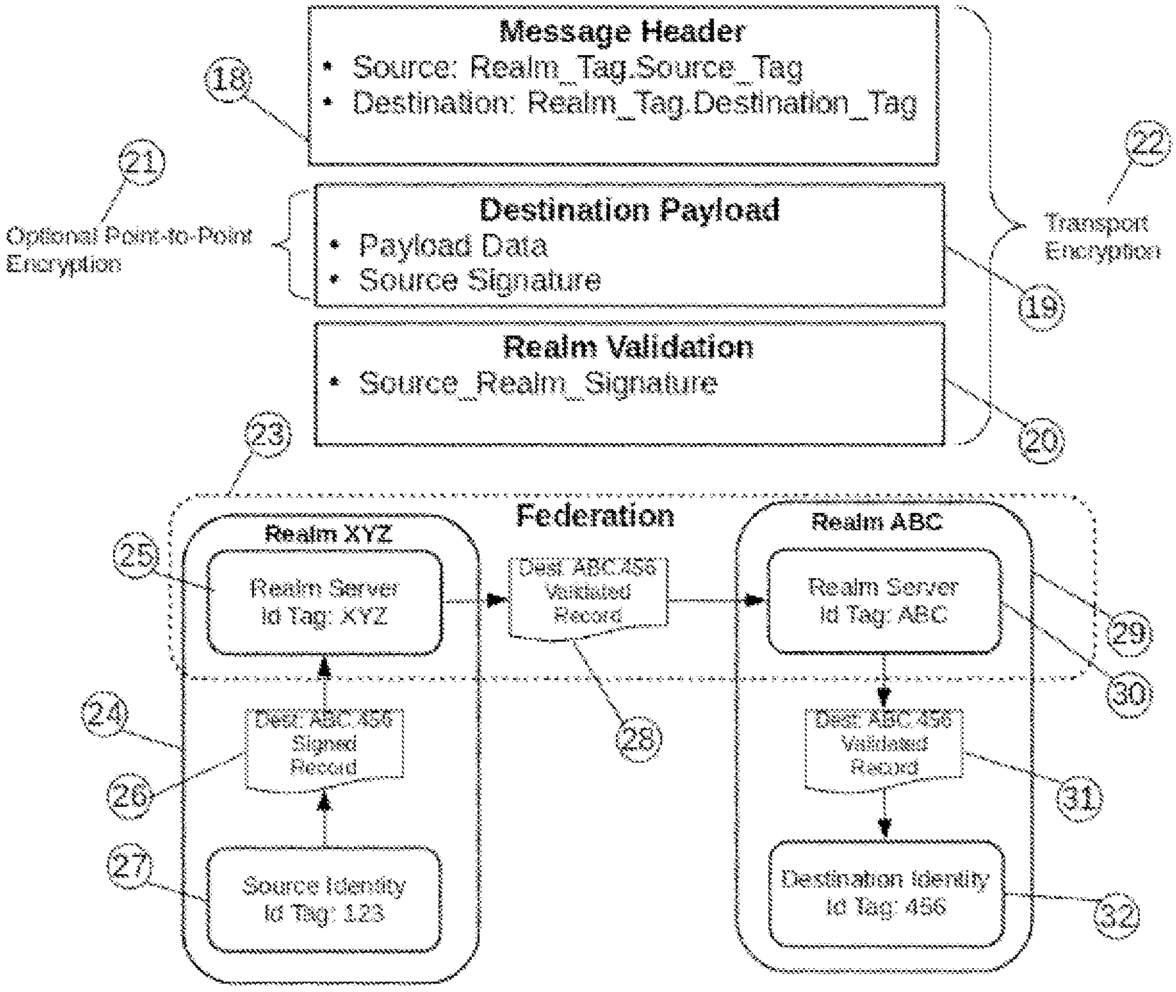
FIG. 7 depicts a message structure and routing example.

Messaging services are used to distribute identity related and operational data. FIG. 7 depicts a method for structuring a message header 18 and message payload 19, along with a realm validation signature 20.

The message header 18 contains:

1) The identity tag of the source of the message in the format of Realm_Tag.Source_Tag, where Realm_Tag is the identity tag of the realm server and Source_Tag is the identity tag of the message source; and
2) The identity tag of the destination realm and destination identity tag in the form of Realm_Tag.Destination_Tag. The source realm server uses its identity lists stored on its local data store to determine the destination realm server's message broker IP address and port. The message, if the source realm server is subscribed and authorized, is conveyed to the destination realm server, which uses its realm identity list to forward the message to the destination address.

The message payload 19 can optionally be encrypted for point-to-point security 21 using the destination identities public key. The entire message is encrypted for transport 22 on each forwarding leg.

In the example in FIG. 7, within a realm XYZ 24, an edge server 27 with an identity tag of '123' generates a signed message 26 destined for identity '456' 32 in realm ABC 29. The signed message contains the header ABC.456 which is posted to the XYZ realm server 25 which adds its signature to validate the massage and, using its local subscription identity lists, determines the IP address a port for the message broker service on the server ABC 30. The validated message 28 is forwarded to the realm ABC 30 message broker which, in turn, forwards it to the destination identity '456' 32 which is accessible on its local network.

Decentralized Identity Creation Validation and Distribution

Figure 8:
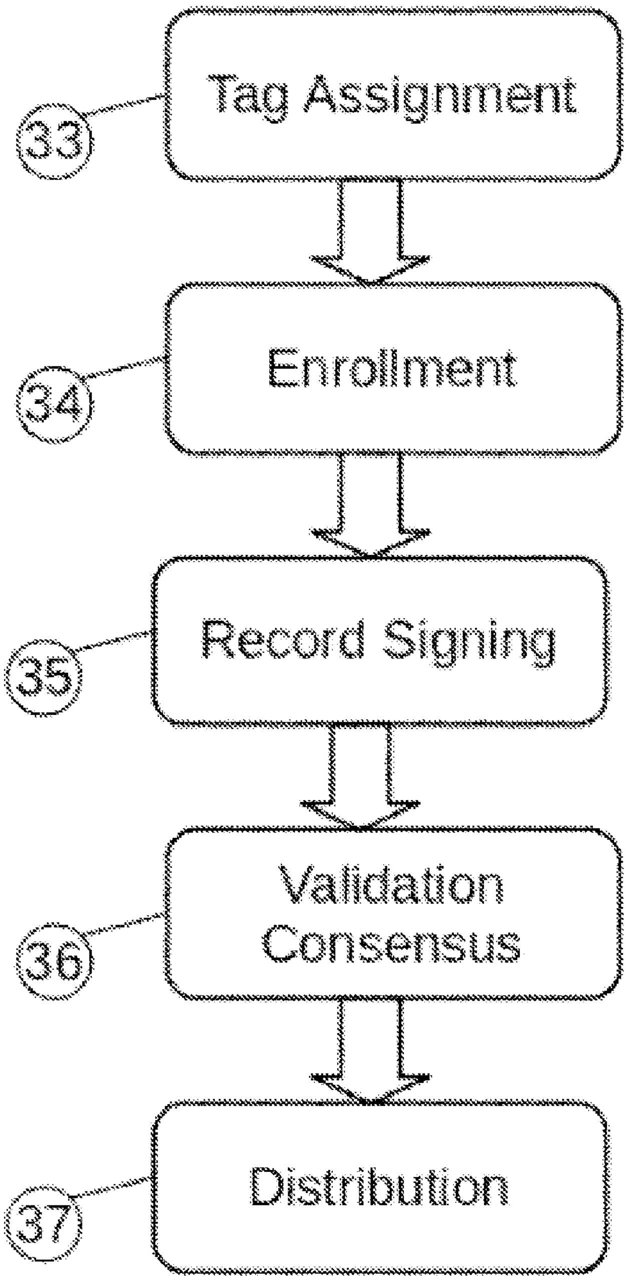
FIG. 8 is a flow diagram showing an identity registration method.

FIG. 8 is a flow diagram depicting how identity information is created, consensus validated, and distributed in a decentralized manner. The steps of this method are as follows:

Tag assignment 33—The creation of a public digital identity begins with an identity authority signed identity tag, issued to a registrar service. A private realm server can optionally issue and sign its own private identity tags for identities that are not required to be searchable or verified on the public Internet. The assignment process associates a new digital identity to a unique identity tag. This process generates a one-time API link and one time pass code to be used by the identity requester to enroll the identity's information.

Enrollment 34—A requester enrolls a public key of identity and additional public information into its identity record. This process is performed using the registrar's document server, which hosts a one-time use API link authenticated with a one-time pass key created in the tag assignment process.

Record signing 35—With the identity record completed in the enrollment process, the registrar signs the identity record using its (the registrar's) private key.

Validation consensus 36—The registrar distributes the signed identity record to realms within its federation(s), where consensus validation is performed based on policies established within the federation. The validation process results in federated realm signatures added to the identity record.

Distribution 37—With validation consensus achieved within the federation, the identity record is available for distribution on a subscription basis to computing devices within the federation.

Realm Network Services

Figure 9:
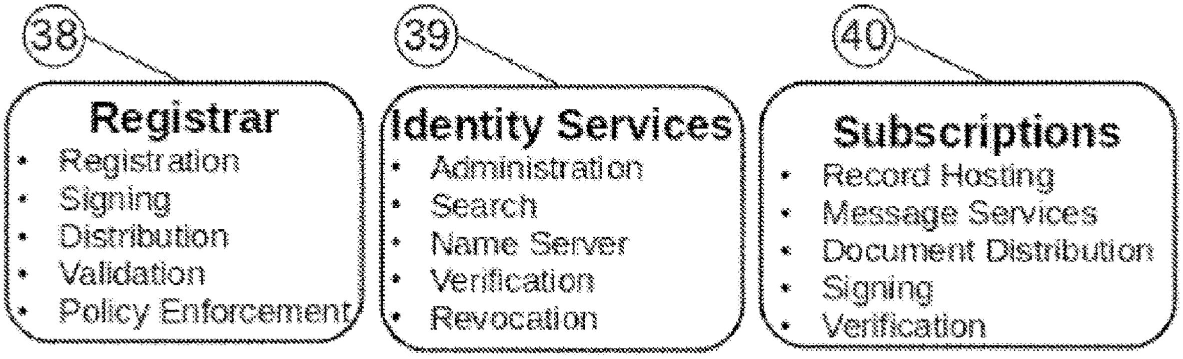
FIG. 9 shows a description of realm network services.

FIG. 9 summarizes the network services provided by realm servers. These services include:

- Registrar 38—Identity registration services that include:
  - Registration—Issuing an identity tag to an identity and enrolling an identity public key and information to create an identity record;
  - Signing—Signing of shared records;
  - Distribution—Distributing identity records and other data to subscribers within its realm and federated realms;
  - Validation—Participating in consensus or multi-signer validation of identity lists and other data within a federation; and
  - Policy Enforcement—Enforcing policies within a federation which include but are not limited to identity enrollment, revocation and validation policies.
- Identity Services 39—Services offered within the realm and with federated realms.

These include:

- Administration—Updates to identity records;
- Search—Identity name and tag search services;
- Name Service—Identity name translation to target service address and port;
- Verification—Verification and signing of Identity records; and
- Revocation—Revocation service for revoking public keys of compromised or out of compliance identity and other records. Timestamped and signed revocation messages sent to authorized subscribers facilitate identity authentication and validation of signed records.

Subscriptions 40—Message and document subscription services, including:

- Record Hosting—Network API for access to shared documents and records;
- Message Services—Message brokering and routing;
- Document Distribution—Distribution of shared documents to other realm hosting services;
- Signing—Adding digital signature to shared documents; and
- Validation—Participating on multi-signing operations on documents, messages and collections to insure data integrity consensus within a federation.

Decentralized Multi-Factor Authentication Methods

Figure 10:
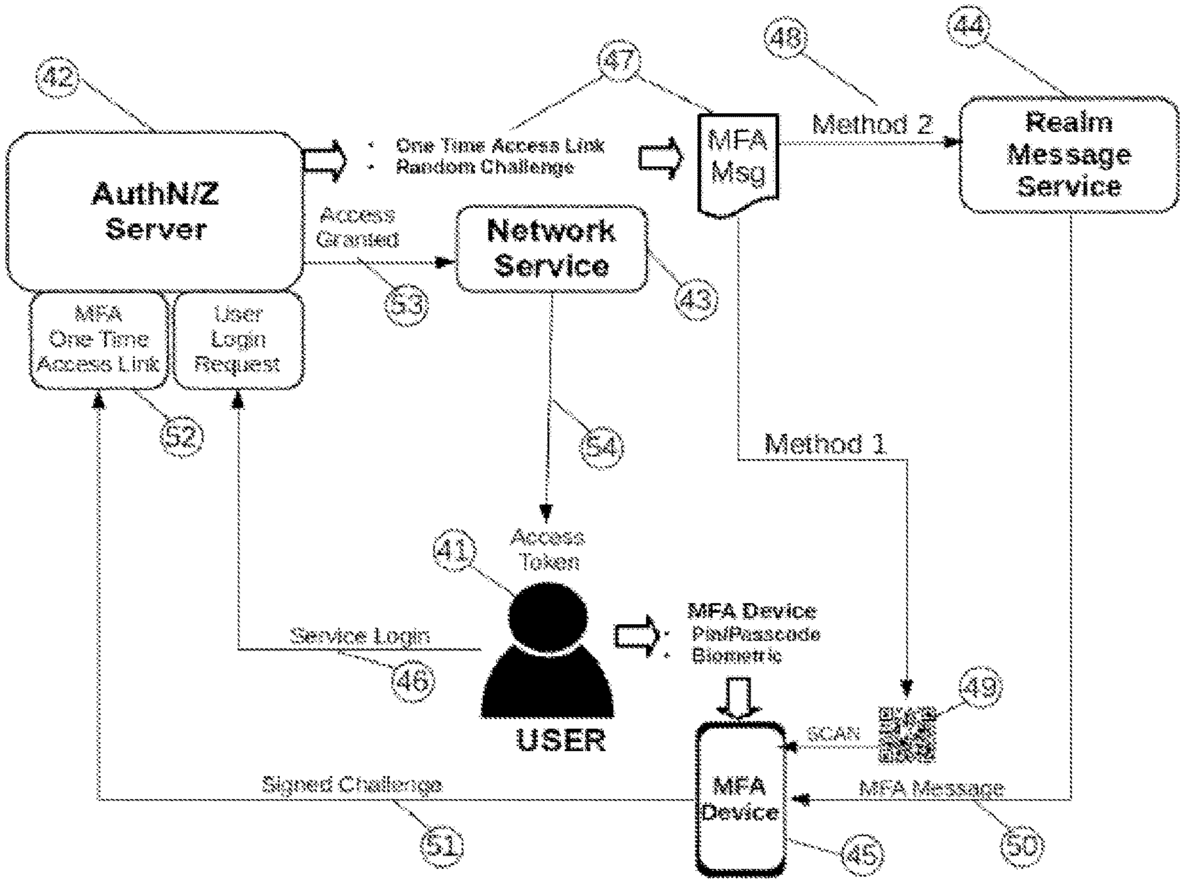
FIG. 10 is a block diagram showing decentralized multi-factor authentication methods.

FIG. 10 is a block diagram that shows a decentralized authentication method using a multi-factor authentication (MFA) device 45. This method requires that the device is capable of:

1. Generating and securely storing asymmetric encryption keys;
2. Connecting to the public Internet;
3. Signing a record or document using a stored private key;
4. Scanning scan-able QR or other visually encoded data; and
5. Operating software to perform multi-factor authentication functions.

FIG. 10 depicts the following:

A user 41 operating a network connected computing device and seeking to be authorized to access a network service 43 sends a login request 46. Login credentials are directed to a authentication/authorization server 42, which identifies the user's ID record and determines that a multi-factor authentication device 45 has been enrolled as a sub-identity in the user's identity record collection.

The authentication server 42 creates a multi-factor authentication (MFA) challenge message 47 consisting of a one-time access link and a random challenge.

The identity record specifies one of two methods for conveying this message:

Method 1 results in the display of a scan-able code 49 on the user's computing device. This can be a QR code or other visually encoded format. The scan-able MFA message 49 is scanned and decoded by the MFA authentication device 45.

Method 2 transmits the MFA message 48 to a realm message service 44, which is designated in the user identity record. The MFA authentication device 45, in method 2 establishes a subscription connection with the designated realm message service 44, where it receives the MFA message 47 via a secure network socket connection.

Upon receiving the MFA message 47, the MFA authentication device 45, signs the random challenge contained in the MFA message 47 and transfers the signed challenge 51 to the designated one-time access link 52 specified in the MFA message 47. Upon completing verification of both the user login and signed MFA challenge, the authentication/authorization server conveys an access granted message 53 to the network service 43 containing users access authorizations and permissions for that service.

Figure 11:
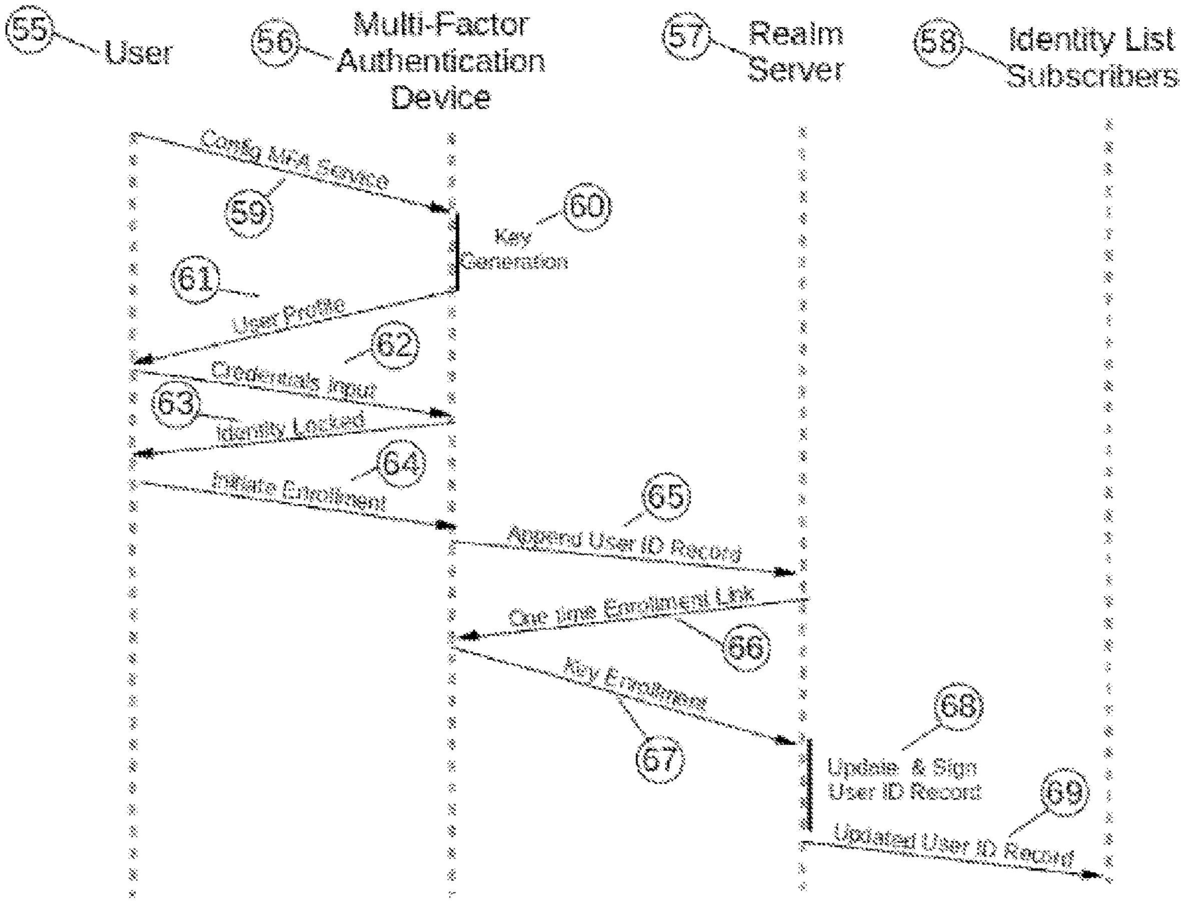
FIG. 11 is a sequence diagram showing a multi-factor authenticator enrollment method.

FIG. 11 is a sequence diagram that details the protocol for enrollment of a multi-factor authentication device 56 with a realm server 57, where the device's information is appended to a user's identity record collection and distributed to subscribers within the realm and other federated realms.

In this method a user 55 who has established an identity record 16 with a realm identity service 9 initiates the configuration 59 process with an MFA device 56. This process spawns the key generation 60 process where public and private keys are generated and private key is securely stored on the MFA device 56 followed by the input of the user profile 61, which includes user identity and realm affiliation. User credentials 62 are recorded on the device which includes, but is not limited to, biometric input, PIN, and password.

With the configuration complete, the user initiates the enrollment process 64 on the MFA device 56.

This process directs MFA device 56 to the users affiliated realm server 57 where the user's identity record collection is appended with a MFA identity tag. The realm server 57 responds with a one-time enrollment link and credentials 66, which the MFA device 56 enrolls its public key 67. The user and realm server 57 sign the updated user identity record 68 enforcing any signing policies required by the realm which minimally includes a user signature of the updated identity record and can optionally require additional signatures before the identity record is published.

Upon completing record update and signing 68 the realm server distributes the updated user record to subscribing services within the realm and with other authorized realms within a federation.

Figure 12:
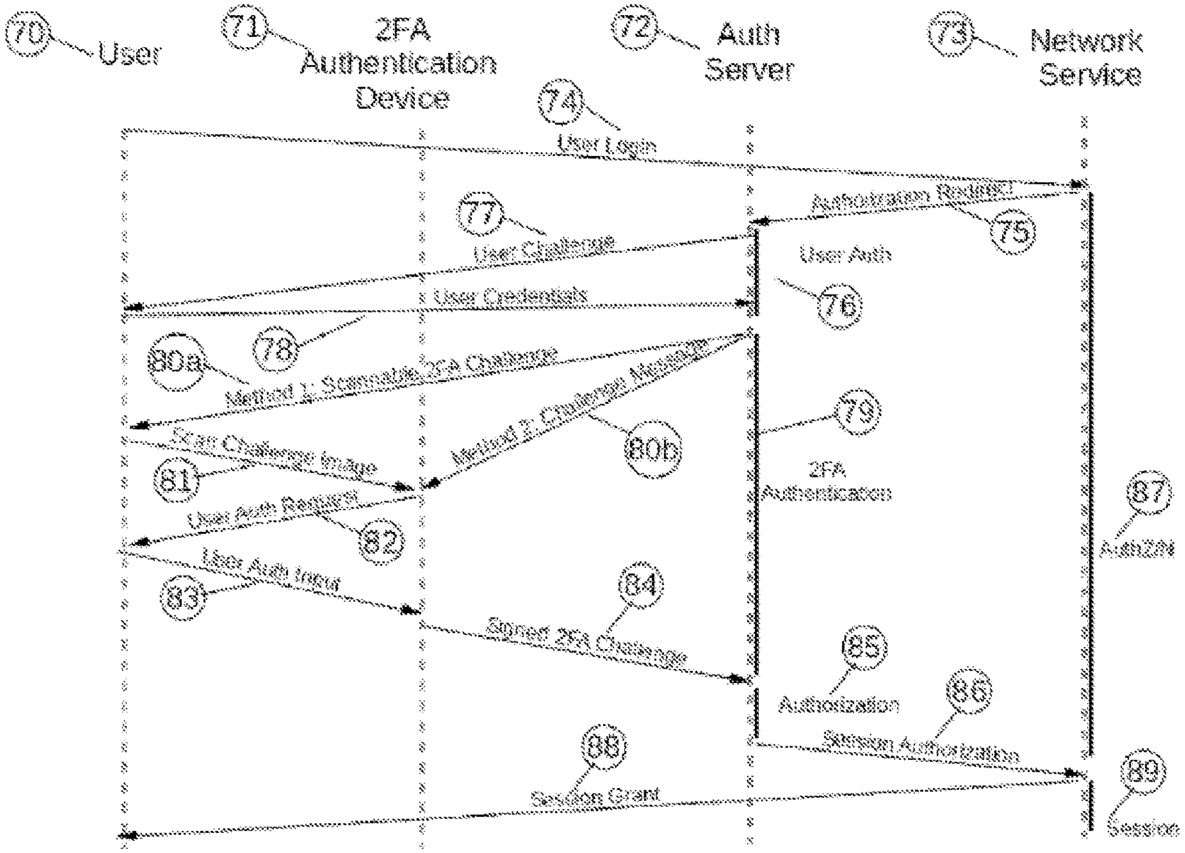
FIG. 12 is a sequence diagram that details the protocol for enrollment of a user with a network service to establish a session.

FIG. 12 is a sequence diagram that details the protocol for enrollment of a user 70 with a network service 73 to establish a session.

In this method a user 70 logs in 74 to the network service. This process spawns an authorization redirect process 75 to the authentication server 72. A user challenge 77 is issued to the user and the user replies by providing the user credentials 78 to the authorization server to effect user authorization 76 by one of two methods:

Method 1 results in the display of a scan-able MFA challenge 80*a* on the user's computing device. This can be a QR code or other visually encoded format. The scan-able MFA challenge 80*a* is scanned 81 and decoded by the MFA authentication device 71.

Method 2 transmits the MFA challenge 80*b* to the MFA authentication device 71. A user authorization request 82 is sent to the user. The user responds with a user authorization input 83 that is sent to the MFA authentication device.

In both methods, the user authentication device 71 forwards a signed MFA challenge 84 to the authorization server 72 which performs an authorization 85 thereby providing session authorization 86, at which point a session is initiated 89 and a session grant 88 is issued to the user.

Computer Implementation

Figure 13:
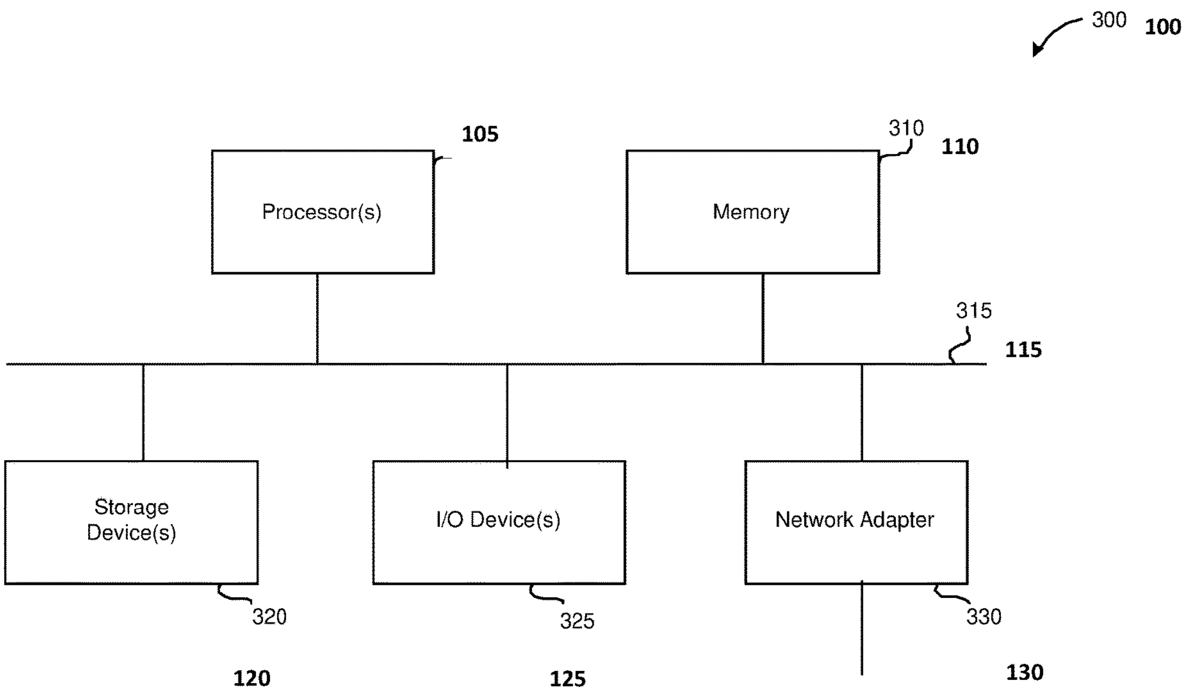
FIG. 13 is a block diagram of a computer system as may be used to implement certain features of some of the embodiments.

FIG. 13 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 100 may include one or more central processing units ("processors") 105, memory 110, input/output devices 125, e.g. keyboard and pointing devices, touch devices, display devices, storage devices 120, e.g. disk drives, and network adapters 130, e.g. network interfaces, that are connected to an interconnect 115. The interconnect 115 is illustrated as an abstraction that represents any one or more separate physical buses, point to point connections, or both connected by appropriate bridges, adapters, or controllers. The interconnect 115, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (12C) bus, or an Institute of Electrical and Electronics Engineers (IEEE) standard 1394 bus, also called Firewire.

The memory 110 and storage devices 120 are computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 110 can be implemented as software and/or firmware to program the processor 105 to carry out actions described above. In some embodiments, such software or firmware may be initially provided to the computing system 100 by downloading it from a remote system through the computing system 100, e.g. via network adapter 130.

The various embodiments introduced herein can be implemented by, for example, programmable circuitry, e.g. one or more microprocessors, programmed with software and/or firmware, or entirely in special purpose hardwired (non-programmable) circuitry, or in a combination of such forms. Special-purpose hardwired circuitry may be in the form of, for example, one or more ASICs, PLDs, FPGAs, etc.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. A method for creation and enrollment of digital identities and publishing of identity records, comprising:

providing one or more realm servers that operate autonomous network services to create, enroll, and validate digital identities affiliated within one or more realms;

said one or more realm servers distributing digital identity information to computing devices within the realm and with other realms within a federation of realms;

said one or more realm servers sharing published identity records with subscribing network services for decentralized authentication and authorization of federated identities accessing network services and for verification of digitally signed data with a federated network of realm servers that distribute identity records associated with each realm;

said one or more realm servers distributing identity records on a subscription basis to computing devices within the realm and to other realms within a federation to maintain relevant identity records on realm servers which distribute said identity records to realm computing devices;

creating hierarchies of digital identities within a realm to facilitate assignment of digital identities to edge servers, personal, mobile, and other computing devices connected on a private network and/or public Internet;

using a consensus methodology comprising an addition of one or multiple digital signatures of realm servers within a federation to provide additional validation of identity records; and sharing published identity records with subscribing network services to enable decentralized authentication and authorization of federated identities accessing network services and verification of digitally signed data with a federated network of realm servers that distribute identity records associated with each realm;

wherein records are distributed on a subscription basis to computing devices within the realm and to other realms within a federation to enable relevant identity records to be maintained by realm servers which distribute this information to realm computing devices;

wherein said realm computing devices authenticate access to services using identity records stored locally on the realm computing devices; and wherein said realm computing devices generate and authenticate digital signatures on information shared with services.

2. The method of claim 1, further comprising: said computing devices within a realm authenticating access to services using locally stored identity records; and said computing devices within the realm generating and authenticating digital signatures on information shared with services.

3. The method of claim 1, further comprising: said one or more realm servers sharing digital identity records within an organization or realm and across federations of organizations or realms to authenticate identities and validate data signed by digital identities.

4. The method of claim 1, wherein said realms comprise realm classes comprising any of: personal realms that represent an individual with multiple network connected computing devices; household realms that represent a household of personal and household computing devices; and organization realms that represent a business or enterprise with multiple users, and computing devices.

5. The method of claim 4, wherein said identity records contain public encryption keys of identities and additional identity information, enabling records, documents, messages, and collections of records to be digitally signed by one or more signers.

6. The method of claim 1, further comprising: using locally stored identity records, maintained on a subscription basis, to provide decentralized authentication of signed data.

7. The method of claim 1, further comprising: said realms and federations independently or collectively establishing policies for consensus validation of identity records and other shared data.

8. The method of claim 1, further comprising: subscribing only to specific records or collections of records relevant to local services to limit information stored locally and reduce subscription network traffic and memory requirements.

* * * * *